United States Patent Office 3,310,589
Patented Mar. 21, 1967

3,310,589
DIBROMODIFLUOROMETHANE ADDITION
TO OLEFINES
Arthur Donald Ketley, Olney, Md., assignor to W. R.
Grace & Co., New York, N.Y., a corporation of
Connecticut
No Drawing. Filed Jan. 29, 1964, Ser. No. 341,091
10 Claims. (Cl. 260—648)

This invention relates to a new chemical process and reaction products produced therefrom.

In summary, this invention comprises reacting an organic compound containing a mono-olefinic unsaturation site:

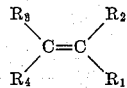

wherein $R_1$, $R_2$, $R_3$, $R_4$ can be alkyl, aryl, aralkyl, cyclic, heterocyclic, acyclic, or hydrogen; any or all of the R groups being the same or different and the compound containing 0 to 4 hydrogens; with dibromodifluoromethane in the presence of a Zn/Cu couple in an inert solvent at a temperature from 0° to the reflux temperature of said solvent for a period of 8 to 100 hours; thereupon filtering, washing, and drying the reaction solution; and distilling said solution to remove solvent and $CF_2Br_2$ from product, which is:

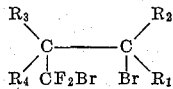

$R_1$, $R_2$, $R_3$, $R_4$ having the same meanings as above.

The compounds produced by my invention can be used as monomers or co-monomers for condensation polymers.

In the foregoing definition of the R groups present on the mono-olefinic reactant, it is evident to one skilled in the art that the only limitations placed on these groups is that their size cannot be such that steric hindrance occurs, so as to prevent the reaction.

I have also determined that the R groups may be substituted with oxy, amino, amine, amide, or other groups without hindering the reaction.

Examples of compounds which can be used in this reaction include, but are not limited to: ethylene, propylene, butene-1, pentene-1; 2-methylbutene-1; cyclopentene; hexene-1; cyclohexene; 2,4,4-trimethylpentene-2; styrene; vinyl pyridine; acrylic acid; n-butyl acrylate; 1,2,4-trimethoxy-5 propenyl benzene; 3-buten-1-ol; o-nitro cinnamic acid; ethyl vinyl ether; phenyl vinyl ether; vinyl amine, etc. Substantially any olefinic compound conventionally used in the art for addition reaction with $CF_2Br_2$ is suitable for use in the process of this invention.

Actually, the only substitutive groups which are non-reactive are those which are inhibitors for free-radical reactions, i.e., quinones, nitroso groups, etc.

The addition of polyhalogenated methanes to olefins is a comparatively new reaction, being, in fact, one of the few organic reactions discovered since 1940 that has achieved wide industrial importance. The usual conditions for a reaction of this type involve the presence of a peroxide initiator, e.g., benzoyl or acetyl peroxide. However, since these reactions are ordinarily strongly exothermic, it is evident to one skilled in the art that peroxide use creates a potentially dangerous and explosive situation. In fact, in the reaction of dibromodifluoromethane to ethylene, using benzoyl peroxide as initiator, the reaction was sufficiently vigorous to raise the temperature of a 1.4 liter rocking autoclave from 90 to 150° C. in a very short time; and enough pressure was developed to cause breakage of the safety disc which was designed to rupture at 85 atmospheres. (Tarrant and Lovelace, JACS, 76: 3466 (1954).)

There is also the not unlikely result, using a peroxide initiator, of polymerizing the reaction products to yield a mixture of telomeric products, completely undesirable.

It is evident, therefore, that there has long been a need for easily controlled, non-polymerizing reaction conditions in the addition of polyhalomethanes to olefinic compounds.

It is an object of this invention to provide a process whereby dibromodifluoromethane can be safely and controllably added to olefinic sites without polymerization or telomerization of the product.

In this process, the Zn/Cu couple acts as a free radical initiator, probably through the intermediary formation of a metallo-organic complex. During the course of the reaction the cupric oxide of the couple is apparently deposited in the reaction solution as finely divided metallic copper, as evidenced by a reddish powder in the solution, although no analysis was made of this deposit.

Zn/Cu couples are well known in the art. Any conventional Zn/Cu couple is suitable for use in the process of this invention. For use in the following examples, an active couple was obtained by heating zinc dust and cupric oxide (using approximately 9:1 ratio by weight) under a hydrogen atmosphere at 500° C. for 30 minutes, a method old in the art. The couple was obtained as dark grey lumps, which were ground to a fine powder in a mortar before use.

The possible and preferred embodiments of this reaction are as follows:

The solvent used is largely a matter of convenience, and substantially any inert solvent customary in prior art reactions of $CF_2Br_2$ with olefinic compounds is suitable. Lower alkyl ethers such as diethyl ether, isopropyl ether, butyl methyl ether, and di-n-propyl ether was particularly suitable. Since the reaction temperature is the reflux temperature of the solvent, the preferred ether solvents have a boiling point in the range 25–100° C., particularly diethyl ether, boiling at 35° C. However, higher boiling ethers can be used if the reaction is performed under pressure, i.e., 1–5 atmospheres. The changes necessary in the equipment to accommodate a greater pressure would be obvious to one skilled in the art and the atmospheric pressure example is not to be held as limiting to the invention.

The purpose of the extension trap system described in Example I was to keep any reactants from vaporizing. Actually, such precautions can be dispensed with if desired, e.g., a Dry Ice/acetone trap attached to the usual water cooled condenser is suitable for this reaction and, if the reaction temperature is closely controlled, a regular condenser is operable.

The reaction must take place under anhydrous and inert atmosphere conditions to prevent any complex or radical intermediaries in the reaction from participating in side reactions. To achieve this end, all reactants were water-free, and apparatus dry. The helium flow through the reaction vessel therefore, was both to exclude air, and atmospheric water vapor. However, any inert gas, such as nitrogen, or the other noble gases could serve the same purpose as the helium.

The reaction time is at least 8 hours, although it is preferred to use times of 48–50 hours, and the reaction may be continued as long as 100 hours.

Example I

The apparatus used for this process was a 500 ml. 3 neck flask, equipped with stirrer, condenser, and dropping funnel. The condenser was fitted with a drying tube and backed up in succession by a Dry Ice/acetone trap and a liquid nitrogen trap. The equipment was set up, flame-dried, and allowed to cool to room temperature under a nitrogen atmosphere.

The ratio of olefinic compound to $CF_2Br_2$ is not critical and can be any ratio used for this type of addition in the prior art, typically 10–0.1:1 moles of olefinic compound per mole of $CF_2Br_2$. The preferred range is 1:1. The amount of Zn/Cu couple is not critical. 20–500 wt. percent, based on olefinic compound, is operable, 100% being preferred.

125 ml. of sodium dried diethyl ether was placed in the flask with 0.3 mole (22.1 gm.) of the Zn/Cu couple and 0.03 mole (7.6 gm.) of iodine. The reaction will proceed without iodine, but more slowly (the iodine acts as an activator, although with no apparent effect on yield. This role of iodine in reactions involving halogenated compounds is old in the art, e.g., in preparation of Grignard reagents; see McElvain, Characterization of Organic Compounds (1953), p. 242). These reactants were mixed, and a light helium flow was started through the flask, and maintained throughout the reaction. 0.3 mole (24.6 gm.) cyclohexene and 0.3 mole (63 gms.) $CF_2Br_2$ were mixed in the dropping funnel and added over a period of 10 minutes while the flask was cooled in an ice bath to hold the temperature to about 17–18° C. No exotherm or other reactions were noted and the reaction was allowed to run at 17–18° C., throughout the day and 2–3° C., at night, over a period of 5 days. Some $CF_2Br_2$ and ether were discovered in the Dry Ice/acetone trap after 2 days, and more $CF_2Br_2$ (about 20 gms.) was added to the reaction flask to compensate.

In the morning of the fifth day, the reaction was allowed to stay at room temperature for 3 hours before stopping. The reaction mixture was cooled in an ice bath to 5° C., filtered to remove the finely divided red copper precipitate, and the ether solution washed with 5% hydrochloric acid solution, 5% sodium bicarbonate solution and distilled water, and dried over anhydrous magnesium sulfate. At this point, the ether solution was dark brown in color.

A sample of the ether solution was distilled into two fractions, one boiling at 30–38° C., and the other having a boiling point in excess of 200° C.

The high boiling fraction was then distilled at 5 mm. Hg pressure. The major cut was at 110° C./5 mm. Hg (280° C./760 mm. Hg). This material turned brown in the collecting flask; but this color disappeared when washed with 5% $NaHCO_3$, indicating free bromine as the cause of the coloring. The liquid was then dried with anhydrous $MgSO_4$ and filtered.

Two samples of this solution were analysed for elements and molecular weight. Molecular weight was determined by using the Mechrolab vapor pressure osmometer. Results are summarized in Table I. Comparison may be seen there to theoretical calculations based on 1-bromodifluoromethyl, 2-bromocyclohexane.

$(C_7H_{10}Br_2F_2)$

TABLE I

|  | Molecular weight | Quantitative Analysis | | | |
|---|---|---|---|---|---|
|  |  | Percent C | Percent H | Percent F | Percent Br |
| Sample 1 | 296 | 29.47 | 3.79 | 12.68 | 52.29 |
| Sample 2 | 284 | 29.17 | 3.67 | 12.40 | 52.55 |
| Theoretical | 292 | 28.77 | 3.43 | 13.01 | 54.79 |

Example II

The apparatus and reagents were the same as used in Example I, except that 25.3 gm. (0.3 mole) hexene-1 was used as the olefin. An exotherm of 38° C. was noted when the reaction was running at 25° C. which lasted for about 45 minutes. The reaction was run at room temperature during the day and 0° C. during the night for a period of 50 hours.

The reaction solution was treated as in Example I, and distilled through a spinning band column. The following fractions were obtained: 5 ml. at 50° C./5 mm.; 15 ml. at 85–90° C./5 mm.; and 5 ml. at 90° C./5 mm.

The two higher boiling fractions were colored yellow-brown, probably due to free bromine, as the color was removed upon washing with 5% $NaHCO_3$. The 85–90° fraction was analysed and identified as 2-difluorobromomethyl, 1-bromohexane.

I claim:
1. The process of reacting a mono-olefin with dibromodifluoromethane in the presence of a Zn/Cu couple in an inert solvent to add the groups bromodifluoromethyl- and bromo- respectively onto the olefinic carbon atoms of the mono-olefin.
2. The process of claim 1, in which the solvent is a lower alkyl ether.
3. The process of claim 2, in which the solvent is diethyl ether.
4. The process of claim 1, in which the reaction temperature is from 0° C. to the reflux temperature of the solvent.
5. The process of claim 4, in which the reaction temperature is from 0°–35° C.
6. The process of claim 1, in which the olefin is cyclohexene.
7. The process of claim 1, in which the olefin is hexene-1.
8. The process of claim 1, in which 10% mole iodine based on the olefin is added as activator.
9. The process according to claim 1 in which the Zn/Cu couple is used in an amount 20–500 wt. percent based on the amount of olefinic compound.
10. The process according to claim 1 in which the mole ratio of olefinic compound: $CF_2Br_2$ is 10–0.1:1.

References Cited by the Examiner

UNITED STATES PATENTS 2,434,289   1/1948   Schmerling _____ 260—658
2,481,158   9/1949   Schmerling _____ 260—658

FOREIGN PATENTS 844,604   8/1960   Great Britain.

OTHER REFERENCES

Simmons et al.: "J. Am. Chem. Soc.," vol. 81, pp. 4256–62 (1959).

Coates: "Organo-Metallic Compounds," p. 68 (1960).

Migrdichian: "Organic Synthesis," vol. I, pp. 744 and 745 (1957).

LEON ZITVER, *Primary Examiner.*

M. JACOB, *Assistant Examiner.*